(12) United States Patent
Losi

(10) Patent No.: US 6,470,407 B1
(45) Date of Patent: Oct. 22, 2002

(54) METHOD FOR ARBITRATING INTERRUPT PRIORITIES AMONG PERIPHERALS IN A MICROPROCESSOR-BASED SYSTEM

(75) Inventor: Marco Losi, Milan (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/490,961

(22) Filed: Jan. 24, 2000

(30) Foreign Application Priority Data

Feb. 3, 1999 (IT) .......................................... MI99A0205

(51) Int. Cl.[7] .............................................. G06F 13/26
(52) U.S. Cl. ....................... 710/264; 710/107; 710/240; 710/244
(58) Field of Search ................................ 710/260–266, 710/240–244

(56) References Cited

U.S. PATENT DOCUMENTS 4,064,561 A * 12/1977 Jennings ....................... 341/27
5,410,715 A * 4/1995 Ishimoto et al. ............. 710/264
5,859,623 A * 1/1999 Meyn et al. .................. 345/698

* cited by examiner

Primary Examiner—Rupal Dharia
(74) Attorney, Agent, or Firm—Lisa K. Jorgenson; Allen, Dyer, Doppelt, Milbrath & Gilchrist, P.A.

(57) ABSTRACT

A method for arbitrating interrupt priorities among peripherals in a microprocessor-based system includes providing a bus which connects a central processing unit (CPU) to a plurality of peripherals and for transmitting a current priority value of the CPU thereon. The method further includes waiting-for activation of an interrupt line connecting all the peripherals and the CPU by the peripherals having a CPU interrupt request priority which is at least equal to, or greater than, the priority of the CPU. The highest priority among the CPU interrupt requests is determined, and the bus is provided with the value of the corresponding interrupt request. The corresponding interrupt request of the peripheral having the highest interrupt request priority is enabled, and CPU access is granted to the peripheral whose interrupt request has the highest priority

22 Claims, 2 Drawing Sheets

METHOD FOR ARBITRATING INTERRUPT PRIORITIES AMONG PERIPHERALS IN A MICROPROCESSOR-BASED SYSTEM

FIELD OF THE INVENTION

The present invention relates to a method for arbitrating interrupt priorities among peripherals in a microprocessor-based system

BACKGROUND OF THE INVENTION

In a microprocessor-based system there are usually several peripherals connected to a central processing unit (CPU), and each peripheral must be able to communicate with the CPU at all times. To ensure that the requests originating from each peripheral can be distinguished from each other, and if simultaneous requests for access to the CPU by two or more peripherals occur, such requests are queued in a deterministic and meaningful manner. It is necessary to have a CPU interrupt arbitration logic in order to identify which peripheral, among all those that have an interrupt request which has been sent to the CPU and is accordingly pending, must be serviced by the CPU.

This arbitration logic must have the following requirements. It must be contained in the CPU and should be independent of the number and type of peripherals connected to the system so that it is not necessary to provide a custom CPU for each type of system. There should be no limit (or a very high limit) to the number of peripherals that can be connected to the same CPU. It should be possible to dynamically configure the priority of the various peripherals and to set a priority limit in the CPU so that the peripherals requesting an interrupt whose priority is lower than the set limit do not generate an actual interrupt. The arbitration logic should also use the least possible silicon area of the chip. In addition, the system should operate even when the system clock is stopped. The system clock is then activated as soon as an interrupt request from one of the peripherals connected to the CPU is detected.

In summary, if no peripheral sends an interrupt request to the CPU, the clock is stopped, but the CPU must equally be able to perform its tasks even if it does not have to service the peripherals. The above described arbitration logic, in its most simple form, is a connection of the daisy-chain type among all the peripherals. Each peripheral has an input of the daisy-chain type and a daisy-chain output. The output is active only if the input is active and the peripheral has no pending interrupt requests submitted to the CPU.

The output of one peripheral is connected to the input of the next peripheral in descending order of priority. The input of the first peripheral is connected to a logic level which is always active, and the output of the last peripheral is left floating. FIG. 1 illustrates an arbitration logic of the daisy-chain type, in which a plurality of peripherals 1, 2 and 3 are connected to the same CPU 4.

Each peripheral includes an OR logic device, designated by the reference numerals 5, 6 and 7 respectively for the peripherals 1, 2 and 3. As mentioned, in the first peripheral 1 the output 8 is connected to the input of the next peripheral 2. Likewise, the output 9 of the second peripheral 2 is connected to the input of the third peripheral 3.

The input of the first peripheral 1, designated by the reference numeral 10, is, in the case of FIG. 1, always forced to the logic value zero. Alternatively, it can always be forced to the logic value one if an opposite logic is used. The output 11 of the third peripheral 3 is, instead, always left floating.

Each peripheral further has an interrupt request input IRQ. The peripherals after the first one have an input DC which is provided by the output of the preceding peripheral. If the input IRQ is set to one, the corresponding peripheral sends an interrupt request to the CPU. Each peripheral wins if its input DC is set to zero and IRQ is set to one. Therefore, for example, if the first peripheral 1 outputs a logic value of one which is then fed to the input DC of the peripheral 2, then the peripheral 1 wins with respect to the peripheral 2 and peripheral 3.

The portion of the CPU 4 designated by the reference numeral 12 indicates the arbitration logic arranged within the CPU. The connection 13 indicates the connection by which the CPU communicates with the peripherals 1, 2 and 3.

The above-described embodiment is satisfactory with regards to the independence of the arbitration logic with respect to the number of connected peripherals, the arbitration speed of the system, and the number of peripherals that can be connected, silicon area occupation and operation with the system clock stopped. However, it is not possible to dynamically configure the priority of the various peripherals and to set a priority limit in the CPU so that peripherals requesting an interrupt with a priority below the set limit do not actually generate an interrupt.

Another approach requires the use of a priority encoder in the CPU, with an input for each peripheral. The drawback of this approach lies in determining the number of interrupt request inputs. If this number is set low, then there is a limit to the number of peripherals that can be connected to the system. Otherwise, if it is set to a high value, the requirement of the least possible silicon area consumption is not met. Finally, if the number of outputs is chosen according to the number of peripherals, then the requirement of the arbitration logic is independent of the number of peripherals that can be connected to the central processing unit is not met.

A third conventional approach is based on a serial interrupt bus to which the CPU and the peripherals with pending interrupt requests serially send their priority. The serial interrupt bus is a wired-OR connection. If many devices send conflicting logic values simultaneously, the bus assumes an active logic value.

The priorities are arranged on the bus bit by bit, starting from the most significant bit. At any time, if a peripheral detects on the bus a value which differs from the value that it is forcing on the bus, then that peripheral has lost the arbitration because another peripheral has a higher priority. The first different bit in the priority value is zero for the losing peripheral, and one for the winning peripheral. The losing peripherals do not take part in arbitrating subsequent priority bits. At the end of the arbitration, only the peripheral with the highest priority has never lost, and, is therefore, the winner. If two peripherals have the same priority, then a so-called daisy-chain connection through all the peripheral decides the final priority. Two peripherals can have the same priority if there are more peripherals than priority levels.

If the CPU takes part in the arbitration exactly like any peripheral with a pending interrupt, then the interrupts that arrive from peripherals whose priority is lower than the priority of the CPU are automatically rejected. This last approach meets the above-listed requirements, except for the fact that the system does not perform arbitration in the smallest number of clock cycles and the system does not operate when the system clock is stopped.

A number of clock cycles equal to the number of bits in the priority values must in fact elapse before it is known whether there is a pending interrupt request that must be serviced, or the CPU has instead won the arbitration with the peripherals. Therefore, before modifying the priorities it is necessary to complete the entire arbitration cycle.

SUMMARY OF THE INVENTION

An object of the present invention is to provide a method for arbitrating interrupt priorities among peripherals which overcomes the drawbacks of the above described approaches, and, in particular, in which the arbitration logic is independent of the number and type of peripherals connected to the system.

Another object of the present invention is to provide a method for arbitrating interrupt priorities among peripherals in which there is no limit to the number of peripherals that can be connected to the central system.

Yet another object of the present invention is to provide a method for arbitrating interrupt priorities among peripherals in which the system performs arbitration in the smallest possible number of clock cycles.

A further object of the present invention is to provide a method for arbitrating interrupt priorities among peripherals in which it is possible to dynamically configure the priority of the various peripherals so as to define a priority limit below which no interrupt is generated in the CPU of the central system.

Another object of the present invention is to provide a method for arbitrating interrupt priorities among peripherals in which the silicon area consumption by the arbitration logic is as small as possible; and a system capable of operating even when the system clock is stopped.

These objects and others which will become apparent hereinafter are achieved by a method for arbitrating interrupt priorities among peripherals in a microprocessor-based system, characterized in that it comprises the steps of:

providing a bus line which connects a central processing unit to one or more peripherals with a current priority value of the central processing unit (CPU);

waiting for the activation, by one or more peripherals having a CPU interrupt request priority which is at least equal to, or greater than, the priority of the central processing unit, of a line for connection among all the peripherals and the CPU;

determining the highest priority among the CPU interrupt requests of the one or more peripherals;

providing the bus line with the value of the interrupt request that has the highest priority determined during the preceding step;

enabling the corresponding interrupt request of the peripheral having the highest interrupt request priority; and granting the CPU to the peripheral whose interrupt request has the highest priority.

BRIEF DESCRIPTION OF THE DRAWINGS

Further characteristics and advantages of the present invention will become apparent from the following detailed description of preferred embodiments of the method according to the invention, illustrated by way of non-limiting examples in the accompanying drawings, wherein.

DETAILED DESCRIPTION OF THE PREFERRED EMBODIMENT

Figure 1:
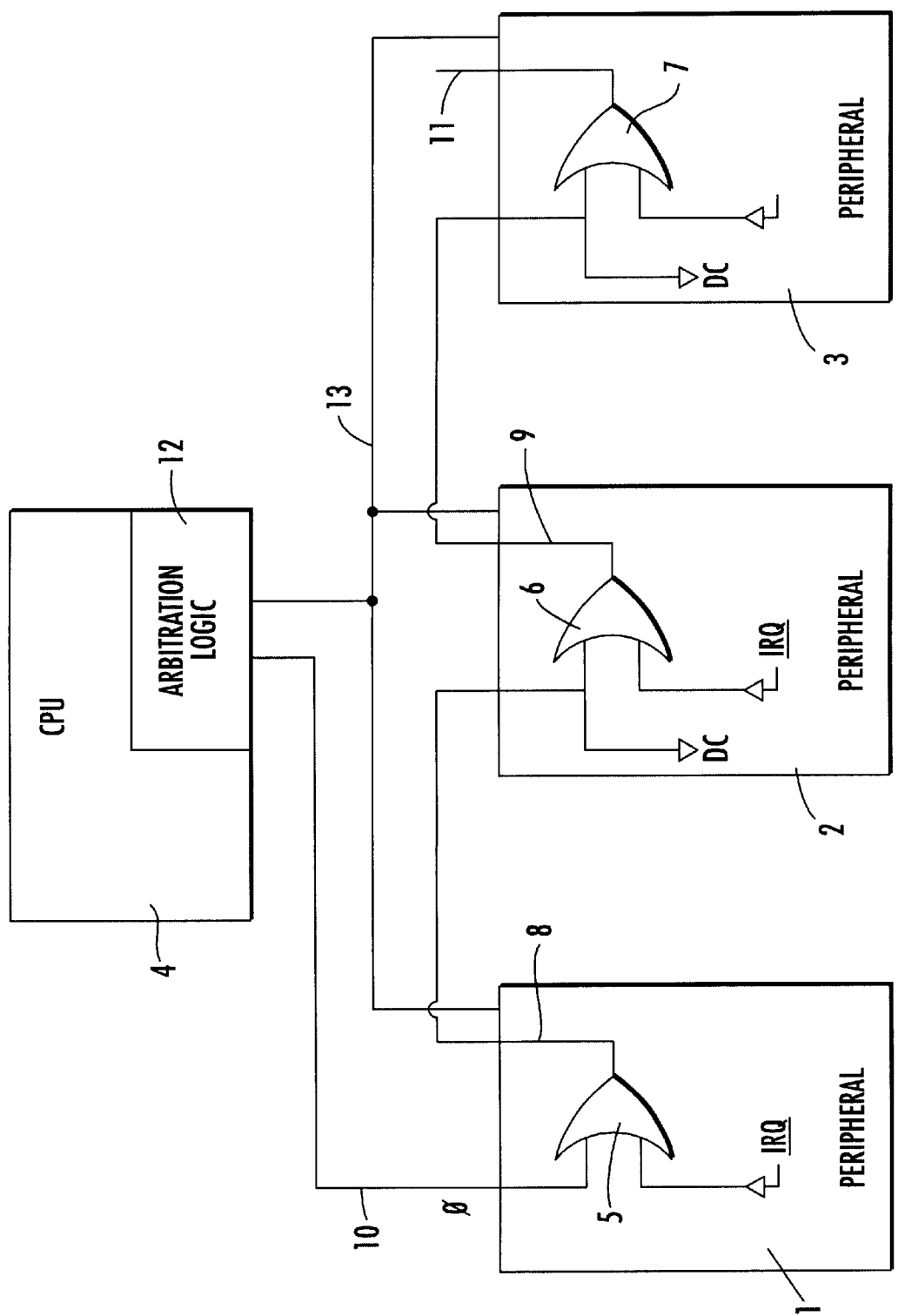
FIG. 1 is a block diagram of a conventional daisy-chain connection architecture connecting peripherals to a central processing unit according to the prior art.
Figure 2:
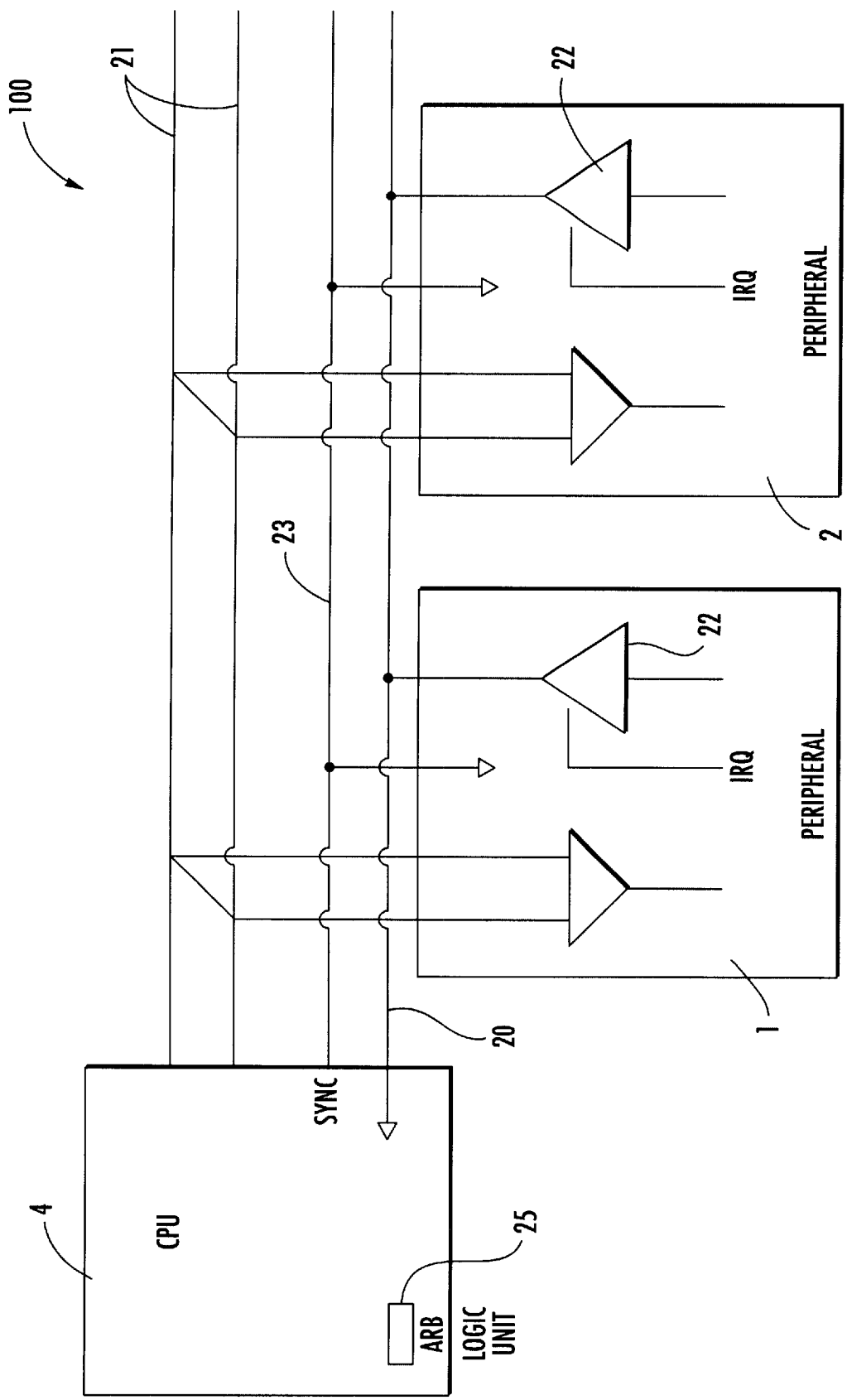
FIG. 2 is a block diagram of an architecture for connecting peripherals to a central processing unit for implementing the method according to the present invention.

As discussed above, FIG. 1 describes a conventional connection architecture and will not be discussed further. With reference, therefore, to FIG. 2, in which reference numerals identical to those of FIG. 1 designate identical elements, the figure thus illustrates an architecture for connecting peripherals to a central processing unit for implementing the method executed according to the present invention.

The system according to the invention, generally designated by the reference numeral 100, therefore comprises a central processing unit (CPU) 4 which is connected to a plurality of peripherals 1, 2 by an interrupt request line of the wired-OR type 20 and by a bus line 21 which transmits to all the peripherals 1, 2 the current priority of the CPU 4. For purposes of illustration, only two peripherals are shown in FIG. 2.

Each peripheral includes a comparator 22 which enables the interrupt requests sent on the line 20 only if the priority of the respective peripheral is higher than, or equal to, the priority that is present on the bus 21, i.e., the priority of the CPU 4. The CPU 4 is provided with an arbitration logic unit 25.

A line 23 for transmitting a signal to notify the peripherals that an arbitration procedure is in progress is provided between the CPU 4 and each peripheral 1, 2 in order to notify all the peripherals when arbitration is performed. Logic means in each peripheral 1, 2 combine priority bits originating from the bus 21 with interrupt bits in order to send them to the comparator 22 when the signal that passes on the line 23 is high. This is done so that the interrupt requests and the priorities of the peripherals are stable during arbitration.

The arbitration logic unit 25 performs the following functions. When no interrupt request is arriving, i.e., if the line 20 is not active, the logic unit 25 feeds the priority of the CPU to the bus 21 so that in the subsequent clock cycles only peripherals whose priority is higher than, or equal to, the priority of the CPU can activate the line 20.

As soon as a peripheral or a plurality of peripherals have a sufficiently high priority to activate the line 20, the signal on the line 23 is deactivated and the instruction sequencer of the CPU is notified of the fact that an interrupt is arriving. At this point, while the CPU places registers within the stack, the arbitration logic unit 25 performs a binary search in order to find the interrupt request that has the highest priority.

The binary search is performed as follows. At the first clock cycle, the arbitration logic unit 25 places on the bus 21 the value that is intermediate in the priority interval, with the most significant bit set to one and all the other bits set to zero. The line 20 is, therefore, active only if the interrupt request having the highest priority is higher than the value that is present on the bus 21. Therefore, if the line 20 is active, the most significant bit of the interrupt request having the highest priority is correctly one, otherwise it is zero.

At the subsequent clock cycle, after setting the previously mentioned bit to the freshly determined value, the next bit of the bus 21 is set to one and the line 20 is examined as before. The next bit is in the order from the most significant bit to the least significant bit. If the line 20 is active, then the value of the bit is confirmed as one, otherwise it is set to zero.

The preceding step is repeated for all the bits of the bus 21. At the end, the bus 21 contains the value of the interrupt request having the highest priority. Therefore, only the corresponding peripheral will have its interrupt request enabled and will therefore be able to access the CPU. When the CPU has finished servicing the interrupt and is ready to accept a new one, it deactivates the line 23 so that a new arbitration cycle can begin.

Each peripheral further comprises a daisy-chain logic which is used to determine which peripheral is to be enabled. Enablement is when, in the above described step, the bus containing the interrupt request has the highest priority, and is therefore ready to enable the corresponding peripheral. There are actually a plurality of peripherals with the same priority and interrupt request simultaneously.

In practice it has been observed that the method for arbitrating interrupt priorities among peripherals, according to the invention, fully achieves the intended aim and objects, since it allows to render the arbitration logic in the CPU to perform independently of the number and type of peripherals. Moreover, there is no limit to the number of peripherals that can be connected to the CPU since any number of peripherals can be connected to the interrupt request lines, and to the bus that connects the CPU to all the various peripherals.

The system further performs arbitration in the smallest possible number of clock cycles since the CPU is started immediately after a pending interrupt request. Differently from the third approach of the prior art mentioned above, arbitration can occur completely or partially in parallel with the peripheral-independent part of interrupt processing according to the number of bits of the priority values and to the duration of the peripheral-independent interrupt processing Arbitration lasts the same number of clock cycles if the priority values have the same number of bits. This peripheral-independent interrupt processing typically includes waiting for the current instruction to end, emptying the queue of waiting instructions, entering the program counter, indicators and other information in the stack, etc.

Precedence among peripherals having the same priority is provided by a fixed daisy-chain connection. However, if a user assigns the same priority to two peripherals, this means that he is not interested in their mutual relative priority, and, therefore, this does not entail a problem.

The silicon area consumption of the system according to the invention is reduced, and finally the system also operates when the system clock is stopped. This is because the interrupt request line that connects all the peripherals to the CPU is connected to the circuit that activates the clock in such a manner that the clock restarts when the signal on the line connecting the peripherals to the CPU is active. If the wired-OR function of the line for connecting the CPU to the peripherals is provided according to a pre-loaded logic, then the clock must be stopped in the evaluation step so that the wired-OR function operates while the clock is stopped.

The arbitration process and the structure described above are susceptible to numerous modifications and variations, all of which are within the scope of the inventive concept. Thus, for example, in order to reduce the duration of the arbitration, the arbitration logic means 25 can be designed so that if a number of the most significant bits of the priority value of the CPU are all set to one, then the corresponding arbitration steps can be skipped since it is already known that for these arbitration steps there is a peripheral whose priority is higher than the value that is present on the bus 21.

This effectively reduces the arbitration time when the CPU is performing critical tasks, i.e., when no loss of CPU power must occur. This further allows the user to provide a compromise between arbitration speed and resolution of the priority value if the system is sized so as to have a large bus. An alternative implementation of the same system provides for combining the interrupt request line that connects the peripherals and the CPU and the daisy-chain logic in each peripheral.

The daisy-chain logic is used as a distributed OR in order to send interrupt requests to the arbitration logic, and at the same time, each peripheral knows whether another peripheral having a higher priority is requesting an interrupt with the same or higher priority level.

Finally, all the details may be replaced with other technically equivalent elements. The disclosures in Italian Patent Application No. MI99A000205 from which this application claims priority are incorporated herein by reference.

That which is claimed is:

1. A method for arbitrating interrupt priorities among peripherals in a microprocessor-based system, the method comprising the steps of:

providing a bus line connecting a central processing unit (CPU) to at least one peripheral and a current priority of the CPU thereon;

waiting for activation of an interrupt line by at least one peripheral having an interrupt request priority at least equal to or greater than the current priority of the CPU, the interrupt line connecting the at least one peripheral and the CPU;

determining a highest interrupt request priority from the one or more peripherals;

providing the bus line with the highest interrupt request priority determined during the preceding step;

enabling an interrupt request corresponding to a peripheral having the highest interrupt request priority; and granting to the peripheral having the highest CPU interrupt request priority access to the CPU.

2. A method according to claim 1, wherein the step of waiting for the activation of the interrupt line comprises the step that includes, for each peripheral, comparing whether the priority of the peripheral is at least equal to greater than the current priority of the CPU.

3. A method according to claim 1, wherein before the step of granting further comprises determining which peripheral is to be enabled if two or more peripherals have the same interrupt request priority and simultaneously request an interrupt of the CPU.

4. A method according to claim 3, wherein the step of determining is performed using a daisy-chain logic.

5. A method according to claim 1, wherein the step of determining comprises:

during a first clock cycle, placing on the bus line an intermediate value in an interval of interrupt request priority values, setting to a first logic value a most significant bit (MSB) of the bus line and setting to a second logic value remaining bits of the bus line, and determining if the interrupt line is active;

at a next clock cycle, setting a bit adjacent the MSB of the bus line to the first logic value, and determining if the interrupt line is active; and repeating the above steps for all bits of the bus line.

6. A method according to claim 1, wherein the step of determining a highest interrupt request priority goes to the step of providing the bus line a value of the highest interrupt request priority if a value of the current priority of the CPU has all its most significant bits (MSBs) set to a first logic value.

7. A method for arbitrating interrupt priorities among peripherals in a microprocessor-based system, the method comprising the steps of:

provided a bus line connecting a central processing unit (CPU) to at least one peripheral and a current priority of the CPU thereon;

waiting for activation of an interrupt line by at least one peripheral having an interrupt request priority at least equal to or greater than the current priority of the CPU, the interrupt line connecting the at least one peripheral and the CPU;

determining a highest interrupt request priority from the one or more peripherals;

providing the bus line with the highest interrupt request priority determined during the preceding step; and if two or more peripherals have the same interrupt request priority and simultaneously request an interrupt of the CPU, then determining which peripheral is to be enabled.

8. A method according to claim 7, further comprising the step of granting to the enabled peripheral access to the CPU.

9. A method according to claim 7, wherein the step of waiting for the activation of the interrupt line comprises the step that includes, for each peripheral, comparing whether the priority of the peripheral is at least equal to greater than the current priority of the CPU.

10. A method according to claim 7, wherein the step of determining is performed using a daisy-chain logic.

11. A method according to claim 7, wherein the step of determining comprises:

during a first clock cycle, placing on the bus line an intermediate value in an interval of interrupt request priority values, setting to a first logic value a most significant bit (MSB) of the bus line and setting to a second logic value remaining bits of the bus line, and determining if the interrupt line is active;

at a next clock cycle, setting a bit adjacent the MSB of the bus line to the first logic value, and determining if the interrupt line is active; and repeating the above steps for all bits of the bus line.

12. A method according to claim 7, wherein the step of determining a highest interrupt request priority goes to the step of providing the bus line a value of the highest interrupt request priority if a value of the current priority of the CPU has all its most significant bits (MSBs) set to a first logic value.

13. A microprocessor-based system comprising:

a central processing unit;

at least one peripheral having an interrupt request priority;

a bus line connecting said CPU to said at least one peripheral and for providing a current priority of the CPU thereon;

an interrupt line connecting said CPU to said at least one peripheral; and a line connecting said CPU to said at least one peripheral and for transmitting a notification signal from said CPU notifying said at least one peripheral that an arbitration procedure is in progress;

each peripheral comprising a comparator for enabling interrupt requests on said interrupt line if a current interrupt request priority of said peripheral is at least equal to or greater than the current priority of the CPU, and a logic circuit for attaching priority bits and interrupt request bits to said comparator when the notification signal is active;

said CPU comprises an arbitration logic unit for determining which one of said one or more peripherals has the highest interrupt request priority and is allowed to interrupt processing of said CPU for servicing said peripheral.

14. A microprocessor-based system according to claim 13, wherein each peripheral further comprises daisy-chain type logic for determining which peripheral is to be enabled if two or more peripherals have the same interrupt request priority and simultaneously request an interrupt of said CPU.

15. A microprocessor-based system according to claim 13, wherein said interrupt line is a wired-OR line.

16. A microprocessor-based system according to claim 13, wherein said CPU comprises:

a first routine for placing on said bus line an intermediate value in an interval of interrupt request priority values during a first clock cycle, setting to a first logic value a most significant bit (MSB) of said bus line and setting to a second logic value remaining bits of said bus line, and determining if said interrupt line is active;

a second routine for setting a bit adjacent the MSB of said bus line to the first logic value at a next clock cycle, and determining if the interrupt line is active; and repeating said first and second routines for all bits of said bus line.

17. A microprocessor-based system according to claim 13, wherein said arbitration logic unit provides said bus line a value of the highest interrupt request priority if a value of the current priority of the CPU has all its most significant bits (MSBs) set to a first logic value.

18. A device for arbitrating central processing unit interrupt priorities of peripherals connected to a central processing unit (CPU), comprising:

an interrupt request line which connects the CPU to the peripherals;

a bus line to transmit a current priority of the CPU to the peripherals;

a comparator within each peripheral to enable interrupt requests on said interrupt request line exclusively if the priority of the peripheral is equal to or greater than the current priority of the CPU; and a line for providing a signal for notifying the peripherals that an arbitration procedure is in progress, said line being driven by said CPU;

a logic circuit within each peripheral for attaching priority bits and interrupt request bits to said comparator when the notification signal is active; and an arbitration logic unit within the CPU for determining which one of the peripherals has the highest interrupt request priority and is allowed to interrupt processing of the CPU for servicing the peripheral.

19. A device according to claim 18, wherein each peripheral comprises daisy-chain type logic for determining which peripheral is to be enabled if two or more peripherals have the same interrupt request priority and simultaneously request an interrupt of the CPU.

20. A device according to claim 18, wherein said interrupt request line is a wired-OR line.

21. A device according to claim 18, wherein the CPU comprises:

a first routine for placing on said bus line an intermediate value in an interval of interrupt request priority values during a first clock cycle, setting to a first logic value a most significant bit (MSB) of said bus line and setting to a second logic value remaining bits of said bus line, and determining if said interrupt request line is active;

a second routine for setting a bit adjacent the MSB of said bus line to the first logic value at a next clock cycle, and determining if the interrupt request line is active; and repeating said first and second routines for all bits of said bus line.

22. A device according to claim 18, wherein said arbitration logic unit provides said bus line a value of the highest interrupt request priority if a value of the current priority of the CPU has all its most significant bits (MSBs) set to a first logic value.

* * * * *